(12) United States Patent
Ferren

(10) Patent No.: US 11,019,403 B2
(45) Date of Patent: *May 25, 2021

(54) TRANSCODER ENABLED CLOUD OF REMOTELY CONTROLLED DEVICES

(71) Applicant: Intel Corporation, Santa Clara, CA (US)

(72) Inventor: Bran Ferren, Beverly Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,173

(22) Filed: Feb. 19, 2019

(65) Prior Publication Data

US 2019/0387285 A1  Dec. 19, 2019

Related U.S. Application Data

(63) Continuation of application No. 15/676,213, filed on Aug. 14, 2017, now Pat. No. 10,212,485, which is a
(Continued)

(51) Int. Cl.
*H04N 21/63* (2011.01)
*H04N 21/437* (2011.01)
(Continued)

(52) U.S. Cl.
CPC ............. *H04N 21/632* (2013.01); *G01S 5/20* (2013.01); *G06F 3/017* (2013.01); *G06F 3/0346* (2013.01);
(Continued)

(58) Field of Classification Search
CPC ...... H04N 21/632; H04N 21/40; H04N 21/63; H04N 21/43165; H04N 5/91; H04N 5/4403; H04N 5/44504; H04N 21/4147; H04N 21/42204; H04N 21/42222; H04N 21/4312; H04N 21/4333; H04N 21/43615; H04N 21/437; H04N 21/4432; H04N 21/4436; H04N 21/4508; H04N 21/4516; H04N 21/4532; H04N 21/482; H04N 21/4882; H04N 21/654; H04N 21/4755; H04N 21/8133; G08C 17/00; G08C 17/02; G08C 19/00; G08C 2201/32; G08C 2201/40;
(Continued)

(56) References Cited

U.S. PATENT DOCUMENTS 6,956,496 B1 * 10/2005 Herz ................... G08C 19/28
340/12.26
7,671,728 B2 * 3/2010 Buehler ........... G08B 13/19615
340/506
(Continued)

*Primary Examiner* — Edwin C Holloway, III
(74) *Attorney, Agent, or Firm* — Kacvinsky Daisak Bluni PLLC

(57) ABSTRACT

Various embodiments are directed to one or more transcoder devices in communication with an input device such as a remote control device and multiple destination devices in which the transcoder device(s) facilitate communication between the remote control and the various destination devices in the vicinity. The transcoder device(s) can also provide the user with an environmental awareness of conditions and events surrounding the user. Other embodiments are described and claimed.

23 Claims, 8 Drawing Sheets

Media Processing System 100

Related U.S. Application Data continuation of application No. 14/789,834, filed on Jul. 1, 2015, now Pat. No. 9,736,546, which is a continuation of application No. 13/819,218, filed as application No. PCT/US2011/049205 on Aug. 25, 2011, now Pat. No. 9,092,798.

(60) Provisional application No. 61/377,588, filed on Aug. 27, 2010.

(51) Int. Cl.

| | | |
|---|---|---|
| *G06F 3/041* | (2006.01) | |
| *H04N 21/422* | (2011.01) | |
| *H04N 21/45* | (2011.01) | |
| *H04N 21/443* | (2011.01) | |
| *G06F 3/01* | (2006.01) | |
| *G06F 3/0482* | (2013.01) | |
| *H04N 21/482* | (2011.01) | |
| *H04N 21/4147* | (2011.01) | |
| *G06K 9/32* | (2006.01) | |
| *H04N 5/445* | (2011.01) | |
| *H04N 21/431* | (2011.01) | |
| *H04N 21/436* | (2011.01) | |
| *H04N 21/488* | (2011.01) | |
| *G06F 3/0484* | (2013.01) | |
| *H04N 21/654* | (2011.01) | |
| *G08C 17/00* | (2006.01) | |
| *G08C 17/02* | (2006.01) | |
| *G08C 19/00* | (2006.01) | |
| *G06F 3/048* | (2013.01) | |
| *G06N 5/02* | (2006.01) | |
| *G01S 5/20* | (2006.01) | |
| *H04N 5/91* | (2006.01) | |
| *H04N 5/44* | (2011.01) | |
| *G06F 3/0485* | (2013.01) | |
| *H04L 29/06* | (2006.01) | |
| *G06Q 30/02* | (2012.01) | |
| *G06F 3/038* | (2013.01) | |
| *G06F 3/0481* | (2013.01) | |
| *G06F 3/0346* | (2013.01) | |
| *H04N 21/433* | (2011.01) | |
| *H04N 21/475* | (2011.01) | |
| *H04N 21/81* | (2011.01) | |

(52) U.S. Cl.
CPC ............ *G06F 3/0383* (2013.01); *G06F 3/041* (2013.01); *G06F 3/048* (2013.01); *G06F 3/0414* (2013.01); *G06F 3/0481* (2013.01); *G06F 3/0482* (2013.01); *G06F 3/0484* (2013.01); *G06F 3/0485* (2013.01); *G06K 9/3266* (2013.01); *G06N 5/02* (2013.01); *G06Q 30/0201* (2013.01); *G08C 17/00* (2013.01); *G08C 17/02* (2013.01); *G08C 19/00* (2013.01); *H04L 65/403* (2013.01); *H04N 5/44504* (2013.01); *H04N 5/91* (2013.01); *H04N 21/4147* (2013.01); *H04N 21/42204* (2013.01); *H04N 21/42222* (2013.01); *H04N 21/437* (2013.01); *H04N 21/4312* (2013.01); *H04N 21/4333* (2013.01); *H04N 21/43615* (2013.01); *H04N 21/4432* (2013.01); *H04N 21/4436* (2013.01); *H04N 21/4508* (2013.01); *H04N 21/4516* (2013.01); *H04N 21/4532* (2013.01); *H04N 21/482* (2013.01); *H04N 21/4882* (2013.01); *H04N 21/63* (2013.01); *H04N 21/654* (2013.01); *G06F 2203/04804* (2013.01); *G08C 2201/32* (2013.01); *G08C 2201/40* (2013.01); *H04N 21/4755* (2013.01); *H04N 21/8133* (2013.01)

(58) Field of Classification Search
CPC .......... G01S 5/20; G06F 3/017; G06F 3/0346; G06F 3/0414; G06F 3/048; G06F 13/00; G06F 3/0383; G06F 3/041; G06F 3/0481; G06F 3/0482; G06F 3/0484; G06F 3/0485; G06F 2203/04804; G06K 9/3266; H04B 10/00; G08B 13/19656; G08B 13/19697; H04L 12/2809; H04L 12/2803; H04L 65/403; G06N 5/02; G06Q 30/0201
USPC ....... 340/12.3, 12.4, 12.5, 12.53, 12.6, 5.61, 340/825.69, 506, 539.11, 539.22, 541; 341/176; 709/223, 225; 725/37, 40, 78, 725/81

See application file for complete search history.

(56) References Cited

U.S. PATENT DOCUMENTS

| | | | | |
|---|---|---|---|---|
| 8,230,466 | B2* | 7/2012 | Cockrell | H04L 12/66 725/81 |
| 10,721,087 | B2* | 7/2020 | Dawes | H04L 67/025 |
| 2006/0168618 | A1* | 7/2006 | Choi | G08C 17/02 725/37 |
| 2008/0068162 | A1* | 3/2008 | Sharma | G08B 13/08 340/545.1 |
| 2008/0117922 | A1* | 5/2008 | Cockrell | H04L 12/66 370/401 |
| 2009/0239587 | A1* | 9/2009 | Negron | G06F 3/04883 455/566 |
| 2009/0244403 | A1* | 10/2009 | Beals | G08C 19/28 348/734 |

\* cited by examiner

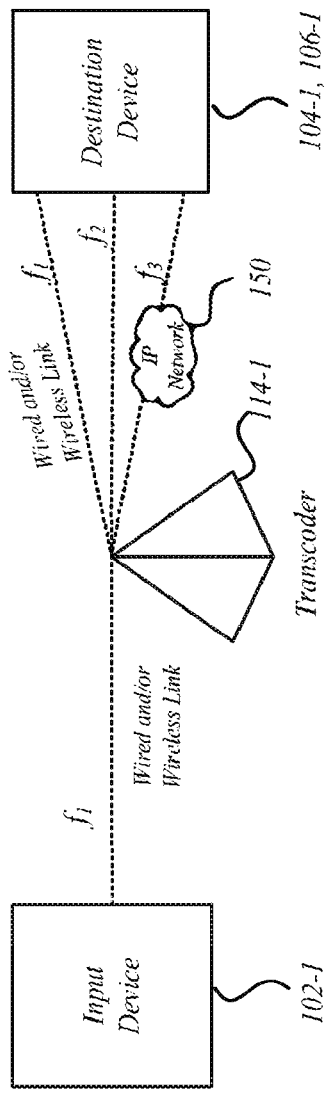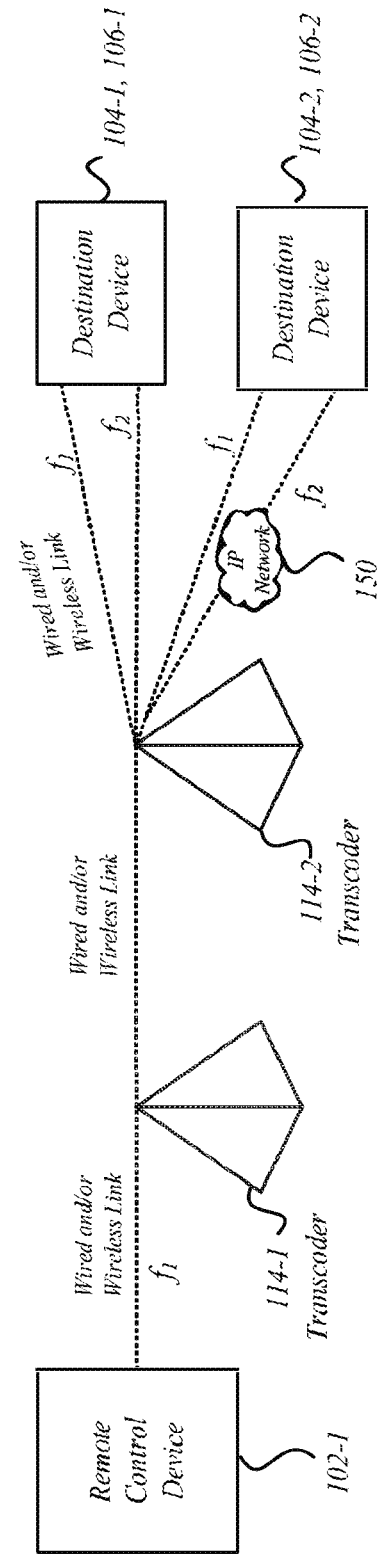
FIG. 5a
FIG. 5b

TRANSCODER ENABLED CLOUD OF REMOTELY CONTROLLED DEVICES

RELATED APPLICATIONS

This application is a continuation of, claims the benefit of and priority to previously filed U.S. patent application Ser. No. 15/676,213 filed Aug. 14, 2017, now U.S. Pat. No. 10,212,485, entitled "TRANSCODER ENABLED CLOUD OF REMOTELY CONTROLLED DEVICES", which is a continuation of, claims the benefit of and priority to previously filed U.S. patent application Ser. No. 14/789,834 filed Jul. 1, 2015, now U.S. Pat. No. 9,736,546, which is a continuation of U.S. patent application Ser. No. 13/819,218 filed Feb. 26, 2013, now U.S. Pat. No. 9,092,798, which is a U.S. national stage entry of International Patent Application No. PCT/US2011/049205 filed Aug. 25, 2011, which claims priority to U.S. Provisional Patent Application Ser. No. 61/377,588 filed Aug. 27, 2010, which are hereby incorporated by reference in their entireties.

BACKGROUND

Many home entertainment systems comprise multiple media sources and output devices that are loosely integrated at best. Media source devices are generally capable of storing and forwarding audio/video content. Output devices are generally capable of displaying video and playing audio in a form understood by a human user. The user is often faced with a scenario that requires her to manipulate multiple remote control devices each associated with a different media source device or output device. Even when the user utilizes a so-called "universal remote", the user is generally required to manually switch modes on the remote control device to ensure that a control directive (e.g., command) is issued to the proper media source or output device.

Accordingly, there may be a need for improved techniques to solve these and other problems.

BRIEF DESCRIPTION OF THE DRAWINGS

FIG. 5a illustrates one embodiment of a transcoder device communicating between a remote control device and a destination device.

FIG. 5b illustrates one embodiment of multiple transcoder devices communicating between a remote control device and multiple destination devices.

DETAILED DESCRIPTION

Figure 1:
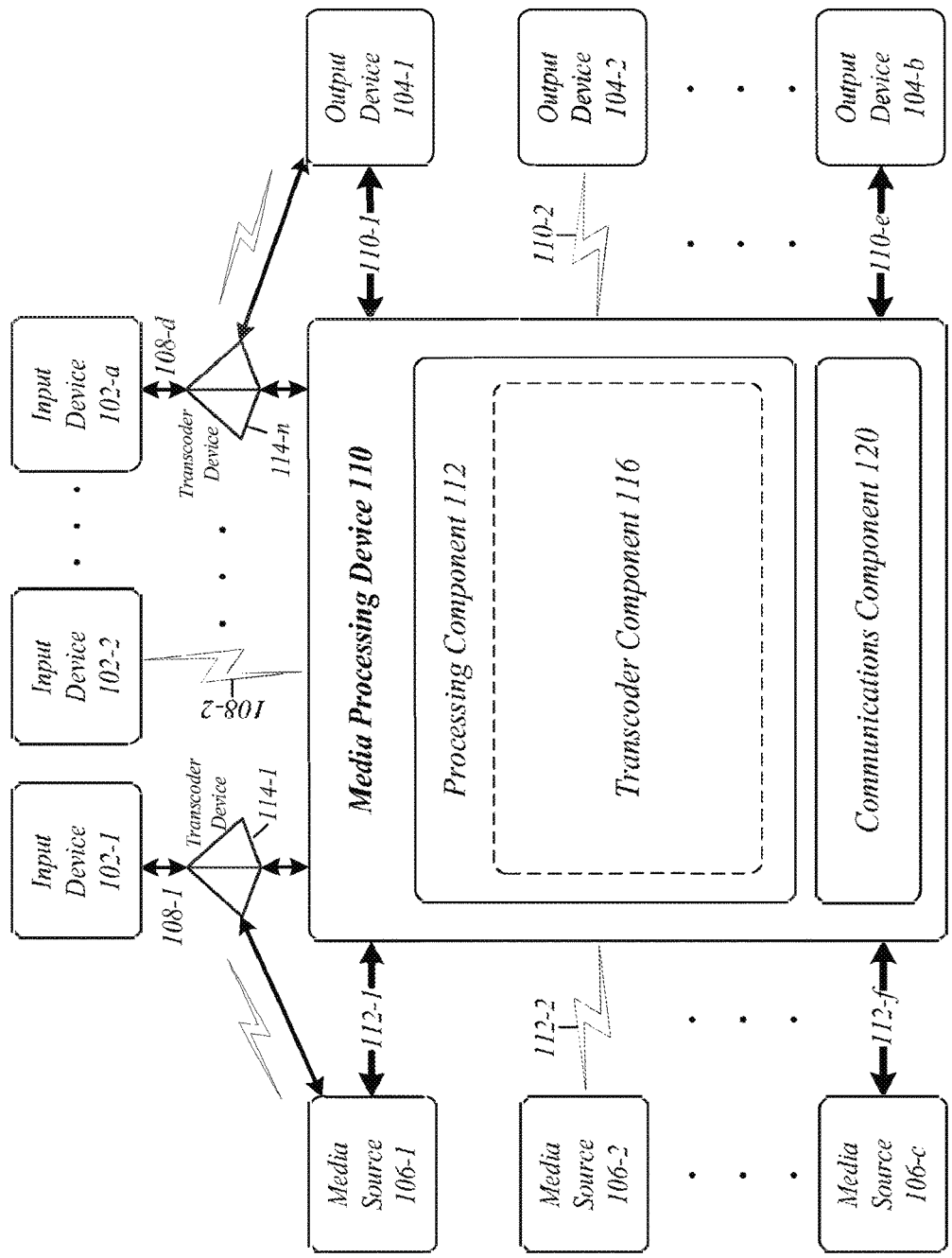
FIG. 1 illustrates one embodiment of a media processing system.

Consumer electronics, processing systems and communications systems are converging. For instance, consumer electronics such as digital televisions and media centers are evolving to include processing capabilities typically found on a computer and communications capabilities typically found in mobile devices. As such, heterogeneous consumer electronics continue to evolve into a single integrated system, sometimes referred to as a "digital home system."

A digital home system may be arranged to provide a compelling entertainment environment in which a user can move seamlessly between television viewing, internet access, and home media management in various embodiments. In some embodiments, a single flexible and dynamic interface may allow a user to find the television programming that they wish to view, acquire the information that they seek from the Web, or enjoy personal audio files, photos, and movies. The system may also facilitate enhanced television viewing, enable collaborative interaction with family and friends, and securely execute financial transactions. A digital home system may provide these features while retaining the familiar design sensibilities and ease-of-use of a traditional television.

In various embodiments, a digital home system may address common deficiencies associated with current entertainment systems in which access to television programming, the internet, and personal media requires operation of three separate interfaces. For example, a unified interface of the digital home system may incorporate physical and graphical elements tied to an easily understood underlying organizational framework, making a home entertainment experience more interesting, compelling, engaging, and efficient. A unified interface may combine the best aspects of the three integrated paradigms, e.g., those of television, internet, and computers. For example, elements such as animation, information-rich displays, and video and audio cues from traditional televisions and television menus may be incorporated into the unified interface. Similarly, seamless integration of different forms of content and communications mechanisms from traditional internet experiences, allowing links from one form of content to another and providing tools such as messaging and video conferencing may also be incorporated. And from computers, point-and-click mechanisms that allow effective navigation of complex information spaces may also be part of the unified interface of the digital home system in various embodiments.

The digital home system may utilize, in some embodiments, a visual display such as a television display as a navigation device. Using the display in combination with any number of remote control devices, a user can carry out complex tasks in fulfilling and transformative ways. The digital home system may include familiar mechanisms such as on-screen programming guides, innovative technologies that facilitate navigation via natural motions and gestures and context-sensitivity that understands the user and the options available to the user which all combine to make the digital home system experience intuitive and efficient as it empowers the user to utilize multiple devices in a seamlessly integrated way.

For a typical television-viewing, media-perusing, and web-browsing home user, the digital home system may be arranged to provide a unified home entertainment experience, allowing the user to freely navigate through television, media, and internet offerings from a traditional viewing position (such as a sofa) using a unified interface. In some embodiments, the unified interface integrates the information provided by a diverse array of devices and services into the existing television or other display in an functionally seamless and easily understood manner.

The digital home system may include, in various embodiments, a multi-axis integrated on-screen navigation component allowing the display screen to be used for navigation as well as for the presentation of content. In some embodiments, the digital home system may also include a user interface engine operative to provide context-sensitive features and overlays intelligently integrated with the underlying content and adaptive to the viewing environment. A family of remote control and other input/output devices may also be incorporated into the digital home system in various embodiments to further enhance the intuitive user interactions, ease of use and overall quality of the system. The embodiments are not limited in this context.

Various embodiments are directed to multiple transcoder devices in communication with a remote control device and multiple output devices and/or media source devices in which the transcoder devices facilitate communication between the remote control and the various destination devices in the vicinity. The transcoder devices can also provide the user with an environmental awareness of conditions and events surrounding the user. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a media processing system 100. The media processing system 100 is generally directed to performing media processing operations for media content in accordance with any associated control signaling necessary for presenting media content on an output device. In one embodiment, the media processing system 100 is particularly arranged to provide media content from disparate media sources to viewers in a home environment, such as a digital home system, for example. However, the media processing system 100 may be suitable for any use scenarios involving presentation and display of media content. Although the media processing system 100 shown in FIG. 1 has a limited number of elements in a certain topology, it may be appreciated that the media processing system 100 may include more or less elements in alternate topologies as desired for a given implementation. The embodiments are not limited in this context.

In various embodiments, various elements of the media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standards, the Advanced Television Systems Committee (ATSC) standards, the Phase Alteration by Line (PAL) standards, the MPEG-1 standard, the MPEG-2 standard, the MPEG-4 standard, the Open Cable standard, the Society of Motion Picture and Television Engineers (SMPTE) Video-Codec (VC-1) standards, the ITU/IEC H.263 and H.264 standards, and others. Another example may include various Digital Video Broadcasting (DVB) standards, such as the Digital Video Broadcasting Terrestrial (DVB-T) broadcasting standard, the DVB Satellite (DVB-S) broadcasting standard, the DVB Cable (DVB-C) broadcasting standard, and others. Digital Video Broadcasting (DVB) is a suite of internationally accepted open standards for digital television. DVB standards are maintained by the DVB Project, an international industry consortium, and they are published by a Joint Technical Committee (JTC) of European Telecommunications Standards Institute (ETSI), European Committee for Electrotechnical Standardization (CENELEC) and European Broadcasting Union (EBU). The embodiments are not limited in this context.

In various embodiments, elements of the media processing system 100 may be arranged to communicate, manage or process different types of information, such as media information and control information. Examples of media information may generally include any data or signals representing multimedia content meant for a user, such as media content, voice information, video information, audio information, image information, textual information, numerical information, alphanumeric symbols, graphics, and so forth. Control information may refer to any data or signals representing commands, instructions, control directives or control words meant for an automated system. For example, control information may be used to route media information through a system, to establish a connection between devices, instruct a device to process the media information in a predetermined manner, monitor or communicate status, perform synchronization, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, the media processing system 100 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, the media processing system 100 may include one or more wireless elements arranged to communicate information over one or more types of wireless communication media. An example of wireless communication media may include portions of a wireless spectrum, such as the RF spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In the illustrated embodiment shown in FIG. 1, the media processing system 100 may comprise a media processing device 110. The media processing device 110 may further comprise one or more input devices 102-a, one or more output devices 104-b, one or more media sources 106-c, and one or more transcoder devices 114-n. The media processing device 110 may be communicatively coupled to the input devices 102-a, the output devices 104-b, the media sources 106-c, and the transcoder devices 114-n via respective wireless or wired communications connections 108-d, 110-e and 112-f.

It is worthy to note that "a" and "b" and "c" and "d" and similar designators as used herein are intended to be variables representing any positive integer. Thus, for example, if an implementation sets a value for a=5, then a complete set of input devices 102-a may include computing devices 102-1, 102-2, 102-3, 102-4 and 102-5. The embodiments are not limited in this context.

In various embodiments, the media processing system 100 may include one or more input devices 102-a. In general, each input device 102-a may comprise any component or device capable of providing information to the media processing device 110. Examples of input devices 102-a may include without limitation remote control devices, pointing devices, keyboards, keypads, trackballs, trackpads, touchscreens, joysticks, game controllers, sensors, biometric sensors, thermal sensors, motion sensors, directional sensors, microphones, microphone arrays, video cameras, video camera arrays, global positioning system devices, mobile computing devices, laptop computers, desktop computers, handheld computing devices, tablet computing devices, netbook computing devices, smart phones, cellular telephones, wearable computers, and so forth. The embodiments are not limited in this context.

In various embodiments, the media processing system 100 may include one or more output devices 104-b. An output device 104-b may comprise any electronic device capable of reproducing, rendering or presenting media content for consumption by a human being. Examples of output devices 104-b may include without limitation a display, an analog display, a digital display, a television display, audio speakers, headphones, a printing device, lighting systems, warning systems, mobile computing devices, laptop computers, desktop computers, handheld computing devices, tablet computing devices, netbook computing devices and so forth. The embodiments are not limited in this context.

In one embodiment, for example, the media processing system 100 may include a display 104-1. The display 104-1 may comprise any analog or digital display capable of presenting media information received from media sources 106-c. The display 104-1 may display the media information at a defined format resolution. In various embodiments, for example, the incoming video signals received from media sources 106-c may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720×1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

In various embodiments, the media processing system 100 may include one or more media sources 106-c. Media sources 106-c may comprise any media source capable of sourcing or delivering media information and/or control information to media processing device 110. More particularly, media sources 106-c may comprise any media source capable of sourcing or delivering digital audio and/or video (AV) signals to media processing device 110. Examples of media sources 106-c may include any hardware or software element capable of storing and/or delivering media information, such as a digital video recorder (DVR), a personal video recorder (PVR), a digital versatile disc (DVD) device, a video home system (VHS) device, a digital VHS device, a disk drive, a hard drive, an optical disc drive a universal serial bus (USB) flash drive, a memory card, a secure digital (SD) memory card, a mass storage device, a flash drive, a computer, a gaming console, a compact disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, smart phones, tablets, notebooks, handheld computers, wearable computers, portable media players (PMP), portable media recorders (PMR), digital audio devices (e.g., MP3 players), digital media servers and so forth. Other examples of media sources 106-c may include media distribution systems to provide broadcast or streaming analog or digital AV signals to media processing device 110. Examples of media distribution systems may include, for example, Over The Air (OTA) broadcast systems, terrestrial cable systems (CATV), satellite broadcast systems, and so forth. It is worthy to note that media sources 106-c may be internal or external to media processing device 110, depending upon a given implementation. The embodiments are not limited in this context.

In various embodiments, the media processing system 100 may include one or more transcoder devices 114-n. A transcoder device 114-n may generally operate as a universal command interpreter to receive control directives from various input devices 102-c, determine a destination device for the control directives (e.g., another input device 102-c, an output device 104-b, or a media source 106-c) from among multiple potential destination devices, and forward the control directives to the appropriate destination device.

Further, the transcoder device 114-n may translate the control directives between varying protocols or data schemas as needed.

In one embodiment, for example, a transcoder device 114-n may comprise multiple wireless transceivers implemented by the communications component 120. The transcoder device 114-n may further comprise a processing component or logic device, similar to the processing component 112 implemented for the media processing device 110, with suitable control hardware or software arranged to receive a control directive sent from an input device 102-1, such as a remote control device. The transcoder device 114-n may then perform any necessary translations, and relay the control directive to one or more destination devices. For instance, this may include the relay of control directives that have arrived over a WiFi or other household (or Internet) networking link to other destination devices that are not necessarily networked. Similarly, a control directive may comprise an intent control directive intended, for example, to turn all destination devices off. In that case, the transcoder may interpret the meta control directive received from a remote control input device 102-1 and may send subsequent control directives to a set of destination devices to power down whether or not the destination devices are on the network. The transcoder device 114-n may receive and process an intent control directive coordinating for the destination devices. Thus, the intent control directive does not need to have any knowledge of the system beyond that it has a "Power Off" intent control directive. Other intent control directives may be programmed into the remote control input device 102-1 and transcoder device 114-n. The embodiments are not limited in this context.

In various embodiments, the media processing system 100 may include one or more media processing devices 110. The media processing device 110 may comprise any electronic device arranged to receive, process, manage, and/or present media information received from media sources 106-c. In general, the media processing device 110 may include, among other elements, a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing or communications architecture. The embodiments are not limited in this context.

The media processing device 110 may execute processing operations or logic for the media processing system 100 using a processing component 112. The processing component 112 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In one embodiment, the processing component 112 may optionally implement a transcoder component 116. The transcoder component 116 may perform operations similar to those performed by a transcoder device 114-n. In one embodiment, the transcoder component 116 may operate to perform all transcoding operations for the media processing system 100. For instance, in this embodiment there are no other transcoding devices 114-n implemented for the media processing system 100, and all transcoding operations are performed by the transcoder component 116 of the media processing device 110. In one embodiment, the transcoder component 116 may perform part of the transcoding operations for the media processing system 100 in conjunction with one or more transcoder devices 114-n. For instance, the transcoder component 116 may cause the media processing device 110 to perform operations as a single transcoder device 114-1 in a system of transcoder devices 114-2 . . . 114-n. In another example, the transcoder component 116 may not perform any transcoding operations, but rather operate as a controller for one or more transcoder devices 114-n implemented for the media processing system 100. In one embodiment, the transcoder component 116 may be disabled or removed thereby leaving transcoding operations to be performed by one or more transcoder devices 114-n. The embodiments are not limited in this context.

The media processing device 110 may execute communications operations or logic for the media processing system 100 using communications component 120. The communications component 120 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 120 may include various types of standard communication elements, such as one or more communications interfaces, network interfaces, network interface cards (NIC), radios, wireless transmitters/receivers (transceivers), wired and/or wireless communication media, infra-red transceivers, serial interfaces, parallel interfaces, bus interfaces, physical connectors, and so forth. By way of example, and not limitation, communication media 120 includes wired communications media and wireless communications media, as previously described.

Figure 2:
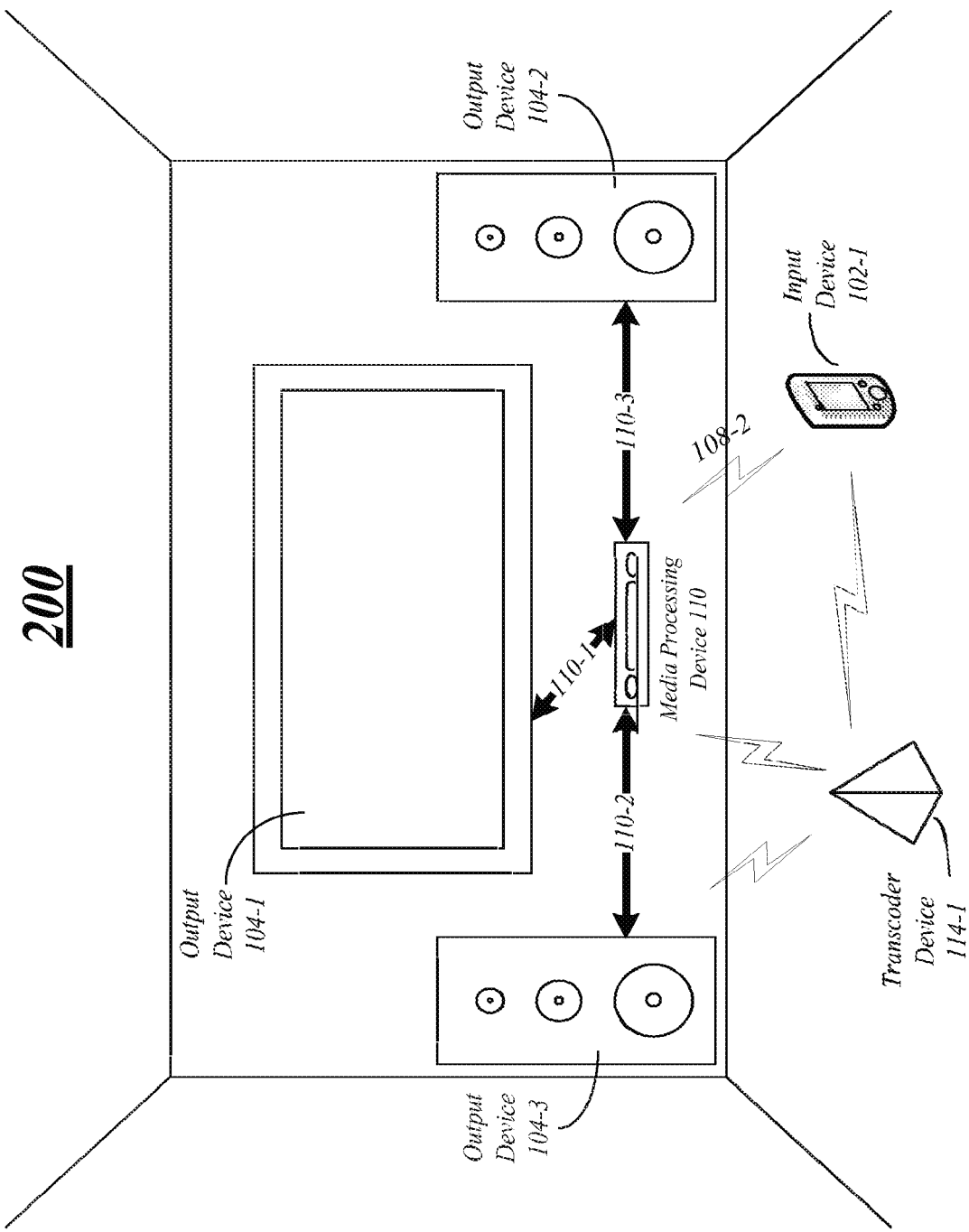
FIG. 2 illustrates one embodiment of a media processing component.

FIG. 2 illustrates a block diagram for a media processing system 200 that may be the same or similar to media processing system 100 of FIG. 1 where like elements are similarly numbered. The media processing system 200 may comprise a sample digital home system implementation that is arranged to provide media content from disparate media sources to viewers in a home, office, or room environment. Although the media processing system 200 shown in FIG. 2 has a limited number of elements in a certain topology, it may be appreciated that the media processing system 200 may include more or less elements in alternate topologies as desired for a given implementation. The embodiments are not limited in this context.

In the illustrated embodiment shown in FIG. 2, the media processing system 200 may comprise a media processing device 110, input device 102-1, output devices 104-1, 104-2 and 104-3, transcoder device 114-1 and one or more media sources 106 (not shown). The media processing device 110 may be communicatively coupled to the input device 102-1, the output devices 104-1, 104-2 and 104-3, transcoder device 114-1 and the media sources 106 via respective wireless or wired communications connections 108-2, 110-1, 110-2 and 110-3. For purposes of illustration, the one or more media sources 106 of FIG. 2 (not shown) are part of, or integrated into, media processing device 110. Other embodiments are described and claimed.

In various embodiments, media processing device 110 may comprise a set-top box, digital media hub, media server, or other suitable processing device arranged to control the digital home system 200. While shown as a separate component in FIG. 2, it should be understood that media processing device 110 may be arranged as part of output device 104-1 or any other suitable component of system 200 in some embodiments. Output device 104-1 may comprise a digital television arranged to display information received from media processing device 110 over connection 110-1 in some embodiments. In various embodiments, output devices 104-2 and 104-3 may comprise speakers arranged to reproduce audio or other acoustic signals received from media processing device 110 over connections 110-2 and 110-3 respectively. Input device 102-1 may comprise a remote control, smart phone, or other suitable processing device capable of communicating with media processing device 110, output device 104-1 or any other device in the digital home system 200. Together, each of the components, nodes or devices of media processing system 200 may form or comprise one example embodiment of digital home entertainment system. The embodiments are not limited to the type, number or arrangement of components illustrated in FIG. 2.

Figure 3:
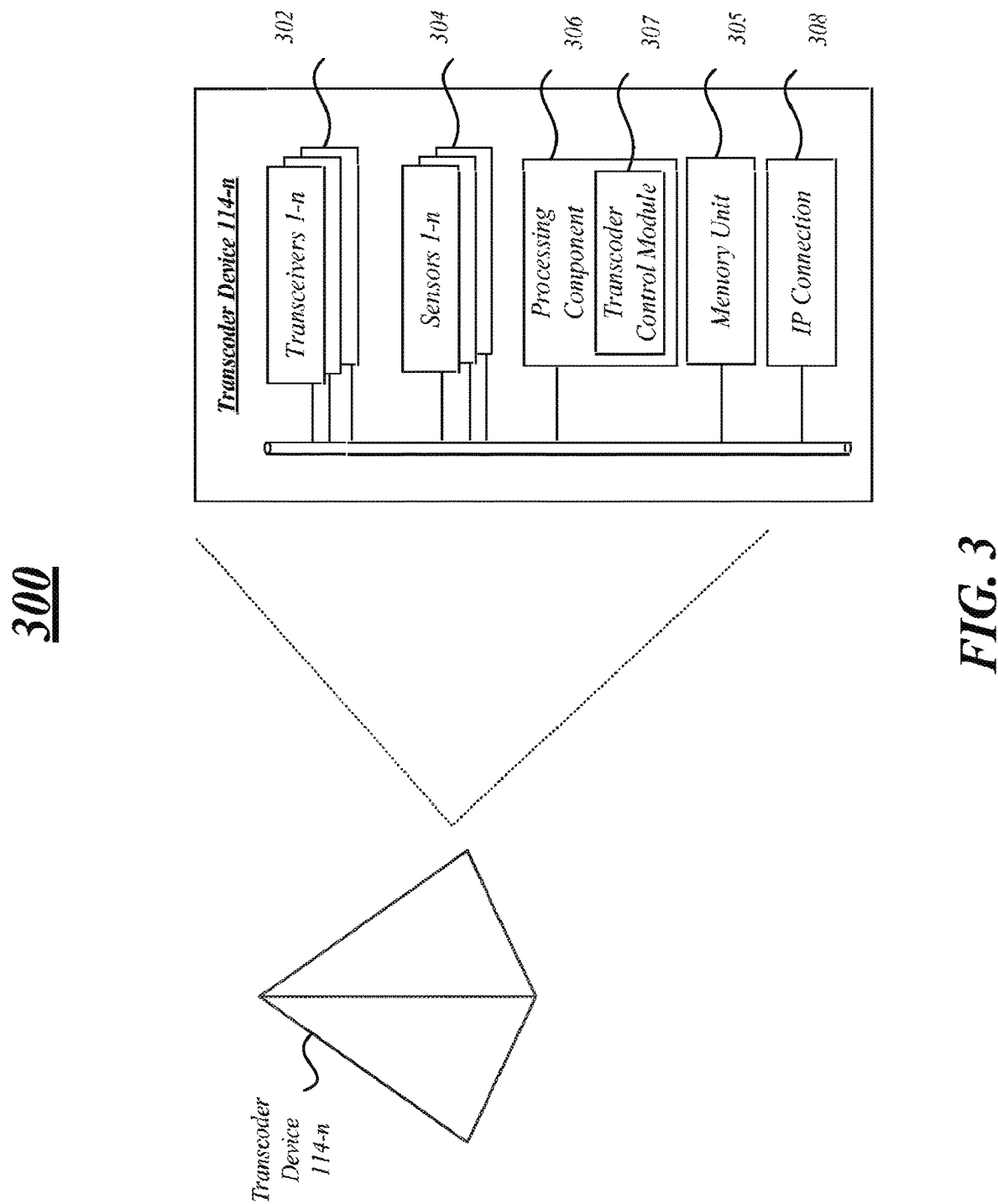
FIG. 3 illustrates one embodiment of a transcoder device.

FIG. 3 illustrates one embodiment of a transcoder device 114-$n$. In various embodiments, the transcoder device 114-$n$ may include one or more wireless transceivers 302 adapted to receive and send information including control directives, for example. The wireless transceivers 302 may include an IR transceiver, an RF transceiver, an ultrasonic transceiver, a Bluetooth™ transceiver, a WiFi transceiver, or any other transceiver capable of sending and receiving wireless signals.

In various embodiments, the transcoder device 114-$n$ may include one or more sensor devices 304 adapted to sense an environmental condition. Types of sensors may include, but are not limited to, a video camera, a light sensor, a motion detector, a thermometer, and a microphone.

In providing an environmental awareness, the transcoder 114-$n$ may be able to capture audio and video conditions in the vicinity of the transcoder 114-$n$ using, for instance, the microphone and video camera. The audio and video may be locally stored or sent to one or more output devices 104-$b$ or media sources 106-$c$ for display or storage respectively. Thus, a transcoder 114-$n$ can act as a surveillance device. Using the motion detector, the transcoder 114-$n$ may also be able to detect motion and trigger an output device 104-$b$ to provide an audio or visual alert or cause the video camera and microphone to start recording data. In another example, a transcoder 114-$n$ may be able to trigger the remote display or storage of audio/video data by communicating with one or more output devices 104-$b$ or media sources 106-$c$ having audio/video recording capabilities. In yet another example, a light sensor can be used to detect whether the display of a television has been turned on to provide confirmation that a control directive to turn on a television was indeed executed. Similarly, a thermometer can act like a thermostat and trigger a control directive to an appliance such as a thermostat control device to raise or lower the temperature by altering the settings for a heating, ventilation and air conditioning (HVAC) system.

In various embodiments, the transcoder device 114-$n$ may include a processing component 306 similar to the processing component 112, the processing component 306 comprising a one or more processors and one or more memory units 305 arranged to process and store data—particularly control directives received from a remote control device or one of the multiple sensor devices. The processing component 306 is operative with the memory units 305, multiple wireless transceivers 302, and multiple sensors 304. The memory units 305 may store data pertaining to the one or more output devices 104-$b$, media sources 106-$c$, or other appliances which can be collectively termed "destination devices" including identifier data representing a unique identifier for each of the one or more destination devices.

In various embodiments, the processing component 306 may comprise or implement a transcoder control module 307. The transcoder control module 307 may implement various types of control logic for the transcoder device 114-$n$. In one embodiment, for example, the transcoder control module 307 may be operative on the processing component 306 (e.g., a processor or other logic device) to receive a control directive sent from a remote control device, identify one or more destination devices from among a set of multiple destination devices to receive the control directive, and relay the control directive to the one or more destination devices.

In various embodiments, the control directives may include the identifier data for an intended destination device such that a transcoder device 114-$n$ may relay the control directive to a destination device based on the identifier data of the destination device stored in the memory.

In various embodiments, the control directives may further comprise multiple control directives that form a single control directive macro such that a single control directive macro can initiate multiple control directives from a transcoder 114-$n$ to one or more of the destination devices. In addition, the single control directive macro can be intended for a single destination device or intended for multiple destination devices.

In various embodiments, the transcoder device 114-$n$ may include network (e.g., Internet Protocol (IP)) connectivity in the form of a wired connection 308 or a wireless connection using, for instance, a WiFi wireless transceiver. For instance, one of the multiple wireless transceivers 302 may be a WiFi receiver with IP connectivity to a local router to provide Internet access. The IP connectivity is operative to allow the transcoder device 114-$n$ to communicate over an IP network such that control directives may be received and transmitted by the transcoder device 114-$n$ over the IP network. A control directive received from a non-IP source may be relayed to an intended destination device over the IP network assuming the destination device is also connected to the IP network.

Figure 4:
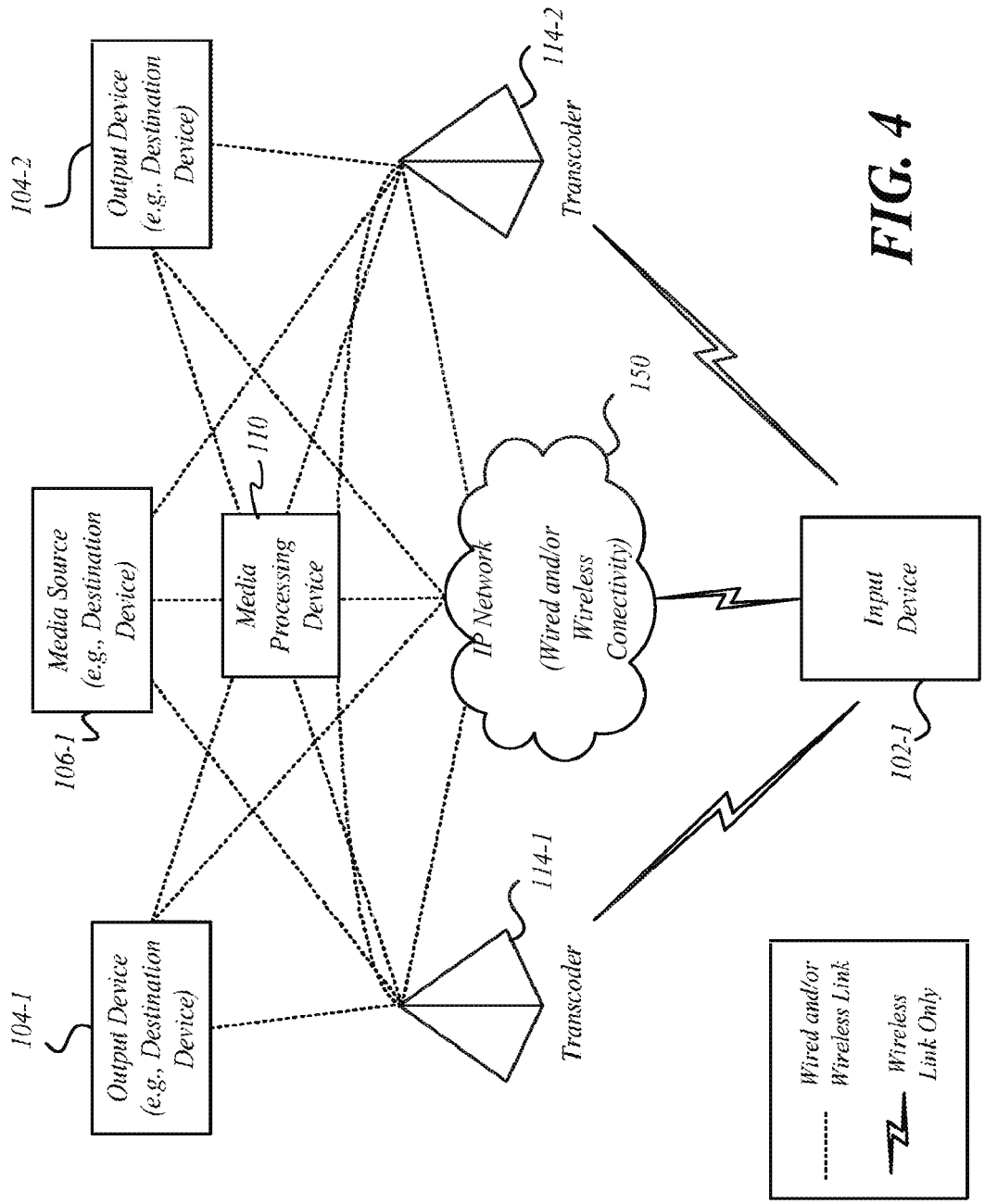
FIG. 4 illustrates one embodiment of a transcoder device system.

FIG. 4 illustrates one embodiment of a transcoder device system 400. In the exemplary embodiment illustrated in FIG. 4, the transcoder device system 400 may include multiple transcoder devices 114-1, 114-2 communicable with multiple output devices 104-1, 104-2, one or more media sources 106-1, or other appliances. The collection of output devices 104-1, 104-2, one or more media sources 106-1 or other appliances (not shown) which are not necessarily networked may be collectively referred to as destination devices. Other appliances may include, for instance, lights or lighting, HVAC controls (e.g., a thermostat), a security system, a fire alarm system, a home automation system, etc. Although FIG. 4 illustrates only two transcoder devices 114-1, 114-2, two output devices 104-1, 104-2, and a single media source 106-1, it may be appreciated that the transcoder device system 400 may implement any number of transcoder devices 114-n, input devices 102-c, output devices 104-b, and/or media sources 106-c as desired for a given implementation. The embodiments are not limited in this context.

The transcoder devices 114-1, 114-2 may also be communicable with an input device 102-1 implemented as, for instance, a remote control device. The remote control input device 102-1 may issue control directives intended for one or more of the multiple destination devices 104-1, 104-2, 106-1 that are received by one of the transcoder devices 114-1. The transcoder device 114-1 receiving the control directive may then relay the control directive to the intended destination devices 104-1, 104-2, 106-1 via the most appropriate transceiver within the transcoder device 114-1 that is directly communicable with the intended destination devices.

In various other embodiments, the transcoder device 114-1 and intended destination devices 104-1, 104-2, 106-1 may be coupled to a common IP network 150 such that control directives received by the transcoder device 114-1 can be routed to the intended destination device over the IP network 150. The transcoder devices 114-n thus allow any destination device to be IP addressable such that a control directive issued by a remote control device may be relayed to the intended destination device without the user having precise knowledge of the exact transmission means or pathway by which the control directive is relayed.

In various other embodiments, a control directive may comprise multiple control directives that form a single control directive macro. A control directive of this type may be received by a transcoder device 114-1 and processed such that the individual control directives are relayed to the intended destination device in the order set out in the control directive macro. In addition, the individual control directives that comprise the control directive macro do not necessarily need to be intended for a single destination device.

A single control directive macro may allow a user to utilize a remote control to control multiple destination devices using a single input command. For example, a user may wish to watch a movie on his home entertainment system. The user can cause a single "intent" control directive (e.g., watch movie) to be sent from a remote control input device 102-1 to a transcoder device 114-1. The single control directive may represent a control directive macro comprised of multiple control directives such as, for instance, a control directive to power on a television, a control directive to switch the mode of the television to DVD input, a control directive to power on a DVD player, a control directive to set the desired volume level for an audio amplifier, a control directive to a home automation system to dim the lights in the room, and a control directive for a DVD player to 'play' a DVD. This set of six (6) control directives intended for multiple destination devices may be executed based on a single intent macro control directive from the remote control.

The transcoder devices 114-1, 114-2 may receive the single control directive macro, and process the individual control directives included in the single control directive macro. The transcoder devices 114-1, 114-2 may then perform any necessary translation operations using processing component 306 and transcoder control module 307, and route the individual control directives to the appropriate destination devices using the appropriate wireless transceivers 302. The transcoder is aided in its processing with its knowledge of the destination devices comprising the home entertainment system. The transcoder devices 114-1, 114-2 may perform such transcoding operations with reference to any timing considerations needed for sequential operations of the destination devices. For example, if a power amplifier needs to be turned on before an audio/video (AV) tuner, and a time needed for transcoding operations of control directives for the power amplifier exceeds a time needed for transcoding operations of control directives for the AV tuner, the transcoder devices 114-1, 114-2 may store the transcoded control directives for the AV tuner and forward them once the transcoded control directives for the power amplifier have been sent.

In another embodiment, the transcoder device 114-1 is coupled with a media processing device 110 and relays control directives to the media processing device 110 for subsequent processing and execution.

FIG. 5a illustrates one embodiment of a transcoder device communicating between a remote control device and a destination device. In various embodiments, a transcoder device 114-1 may receive a control directive from an input device 102-1 such as a remote control device. The control directive may typically be a wireless signal $f_1$ that may be received in the transcoder device 114-1 using one of the multiple transceivers within the transcoder device 114-1. The transcoder device 114-1 may then relay the control directive to an intended destination device 104-1, 106-1 or media processing device 110. The manner in which the transcoder device 114-1 relays the control directive to an intended destination device 104-1, 106-1 may be different from how it was received by the transcoder device 114-1.

For example, the transcoder device 114-1 may receive a control directive from an input remote control device 102-1 over an infrared (IR) transceiver (e.g., signal $f_1$) and simply relay the control directive to the intended destination device 104-1, 106-1 using the same IR transceiver also signal $f_1$. Alternatively, the transcoder device 114-1 may relay the control directive to the intended destination device 104-1, 106-1 using one of the other wireless transceivers (e.g., an RF transceiver transmitting signal $f_2$). In addition, if the control directive is a control directive macro comprised of multiple control directives intended for multiple destination devices, the transcoder device 114-1 may utilize multiple transceivers to relay the multiple control directives. A control directive may also be relayed to an intended destination device 104-1, 106-1 over an IP network 150 (e.g., signal $f_3$) provided the transcoder device 114-1 and the intended destination device 104-1, 106-1 are both coupled to the IP network 150.

FIG. 5b illustrates one embodiment of multiple transcoder devices communicating between a remote control device and multiple destination devices. In various other embodiments, a transcoder device 114-1 may not have direct access to an intended destination device 104-1, 106-1 due to RF range limitations or IR line of sight obstructions. In such instances, the transcoder device 114-1 may relay the control directive to a second transcoder device 114-2. The second transcoder device 114-2 then relays the control directive to the intended destination device 104-1, 106-1. While not shown, more than two transcoder devices 114-n may be communicatively coupled into a cloud of such devices and used to distribute and relay control directives and/or other data (e.g., audio data from a transcoder microphone or video data from a transcoder video camera) as described with reference to FIGS. 5a and 5b.

In another embodiment, the transcoder device 114-1 may use its IP connectivity 308 to upload data to a remote storage destination device that is communicatively coupled with an IP network. The transcoder device 114-1 may communicate over a local area network (LAN), a wide area network (WAN), and/or the Internet to upload data to a remote storage destination device. The remote storage destination device may include, but is not limited to, a cloud storage service, a remote IP addressable hard drive, a laptop computer, etc.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
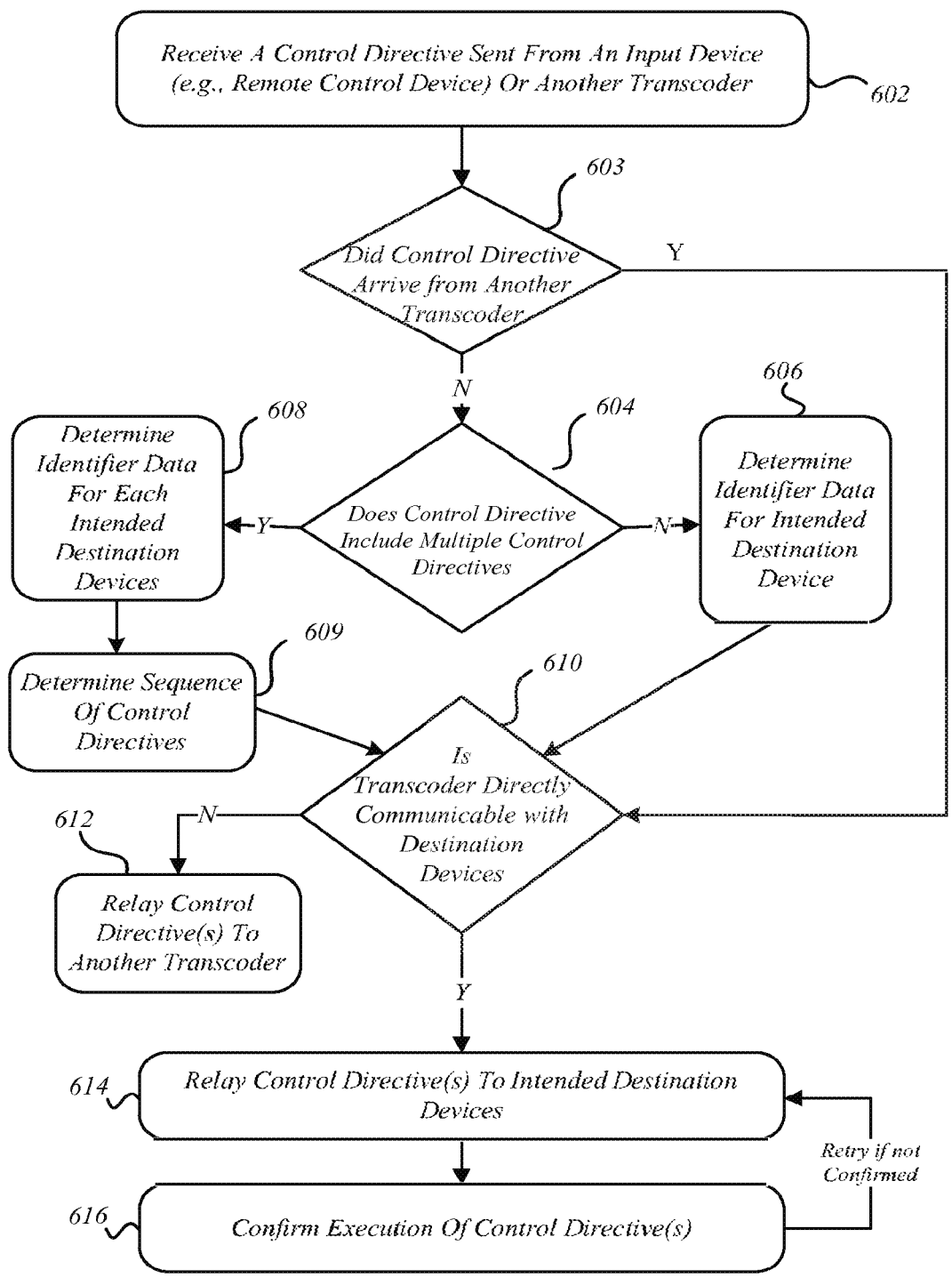
FIG. 6 illustrates one embodiment of a logic flow.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 a transcoder device may receive a control directive sent from an input device (e.g., a remote control device) or another transcoder device 114-n at block 602. For example, a remote control device may send control directive(s) using an IR transmitter. Alternatively, the remote control device may send control directive(s) using an RF transmitter or other transmission means. The control directive(s) may be intended for one or more input devices 102-a, output devices 104-b, media sources 106-c, or other appliances collectively known as destination devices. The transcoder device 114-n may be equipped with multiple different transceivers that can receive the control directives from a variety of transmitters including other transcoder devices 114-n. The embodiments are not limited to this example.

The logic flow 600 may determine if the control directive came from another transcoder device 114-n at block 603. For example, the transcoder device 114-n may include a processor and memory as part of the processing component 306. The processor may be capable of processing the received control directive(s) to determine whether a control directive was received from an input device 102-a or another transcoder device 114-n. If the control directive was received from another transcoder device 114-n, the logic flow will bypass much of the processing described below and pass control directly to block 610 since the processing represented by blocks 604, 606, 608, and 609 has already been performed by the previous transcoder device 114-n. Otherwise, the logic flow will pass control to block 604.

The logic flow 600 may determine if the control directive includes multiple control directives at block 604. For example, the transcoder device 114-n may include a processor and memory as part of the processing component 306. The processor may be capable of processing the received control directive(s) to determine whether a control directive is comprised of multiple control directives combined together in a single control directive macro. The embodiments are not limited to this example.

If the received control directive does not contain multiple control directives as determined in block 604, the logic flow 600 may determine identifier data for the intended destination device at block 606. For example, the memory of the processing component 306 of the transcoder device 114-n may have stored therein identifier data that uniquely identifies various destination devices. This identifier data may include, for instance, a network IP address. The received control directive may include the unique identifier data for the intended destination device. The processor of the processing component 306 may interpret the unique identifier data embedded in the received control directive to determine the intended destination device. The embodiments are not limited to this example.

If the received control directive does contain multiple control directives as determined in block 604, the logic flow 600 may determine identifier data for each of the intended destination devices at block 608. For example, the transcoder device 114-n may perform the same processing described with respect to block 606 above for each of the control directives determined in block 604. In addition, the logic flow 600 may determine sequence of control directives at block 609. For example, multiple control directives may need to be executed in a particular sequence. For instance, a "power on" control directive for a particular destination device may need to be executed before another control directive associated with that destination device. The embodiments are not limited to this example.

The logic flow 600 may determine if the transcoder device is directly communicable with the intended destination devices at block 610. For example, the transcoder device 114-n may determine if the unique identifier data for the intended destination devices determined at blocks 606, 608 is stored in the memory. Alternatively, the transcoder device 114-n may attempt to establish a connection with the intended destination devices based on the unique identifier data determined at blocks 606, 608.

If a first transcoder device 114-1 is not directly communicable with the intended destination devices as determined in block 610, the logic flow 600 may relay the control directive(s) to another transcoder device 114-2 at block 612. For example, the transcoder device 114-1 may not have the unique identifier data for one or more of the intended destination devices stored in its memory and therefore may not be able to relay a control directive to one or more destination devices. Or, the transcoder device 114-1 may not be able to establish a connection with a destination device. In such cases, the transcoder device 114-1 may relay the control directive(s) it cannot relay directly to a destination device to another transcoder device 114-2 that may be directly communicable with an intended destination device. This other transcoder 114-2 may then attempt to relay the control directives to the intended destination devices. If this other transcoder device 114-2 similarly is not directly communicable with the intended destination devices, it may relay the control directive(s) to yet another transcoder device 114-3. The process may be repeated until a transcoder device 114-n that is directly communicable with the intended destination devices is found. Along the way, a transcoder device 114-n may be able to communicate with some but not all destination devices associated with the control directive(s). The transcoder devices 114-n may relay control directives to destination devices when possible and may relay other control directives to another transcoder device 114-n when it is not directly communicable with the destination devices. The embodiments are not limited to this example.

If the transcoder device 114-n is directly communicable with the intended destination devices as determined in block 610, the logic flow 600 may relay the control directive(s) to the intended destination devices at block 614. For example, the transcoder device 114-n may determine that the unique identifier data for the intended destination devices is stored in the transcoder memory. Along with the unique identifier data, the transcoder memory may also store the preferred transceiver to be used to communicate with the intended destination devices. The transcoder device 114-n may then relay the control directive(s) to the intended destination devices using the appropriate transceiver. The embodiments are not limited to this example.

Once the transcoder relays the control directive(s) to the intended destination devices, the logic flow 600 may confirm execution of control directive(s) at block 616. For example, in various embodiments a transcoder device 114-n may include multiple sensors capable of monitoring the environmental status surrounding the transcoder device. A control directive to lower the volume may be verified by a microphone in a transcoder that detects a change in output level from a particular destination device such as an audio amplifier. In another example, the transcoder device 114-n may include a light sensor capable of determining if a destination device such as a television has executed a control directive to power on by sensing the light emitted from the television. Similarly, a control directive to dim the room lights can be detected by a light sensor in a transcoder device 114-n. In another example, the transcoder device 114-n may receive a "receipt confirmed" message followed by a "directive executed" message from a destination device to indicate that the destination device did receive and did attempt to execute the control directive. If the transcoder device 114-n cannot confirm the execution of a control directive after a certain period of time it can attempt to retransmit the control directive. The embodiments are not limited to these examples.

Figure 7:
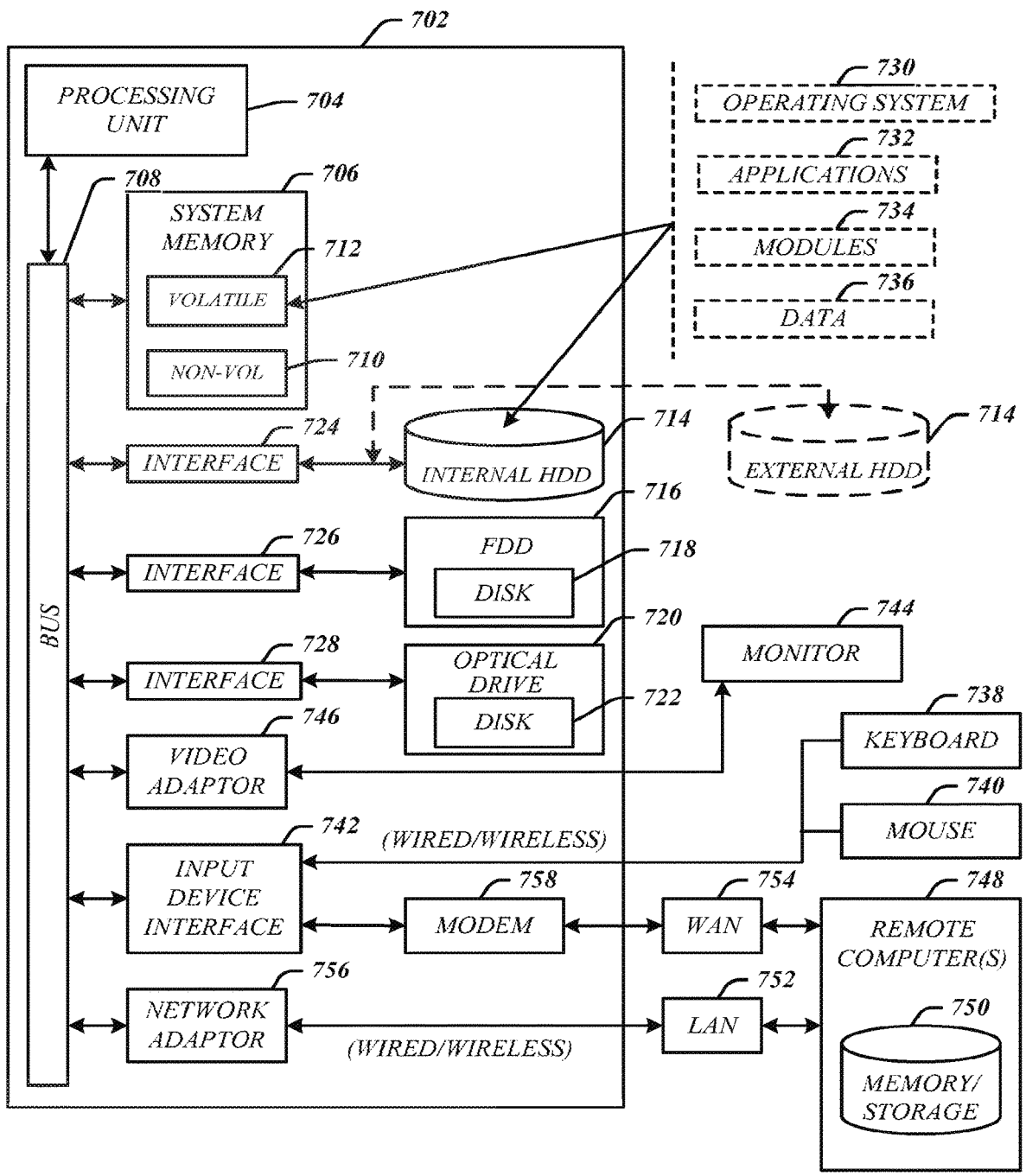
FIG. 7 illustrates one embodiment of a computing architecture.

FIG. 7 illustrates an embodiment of an exemplary computing architecture 700 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
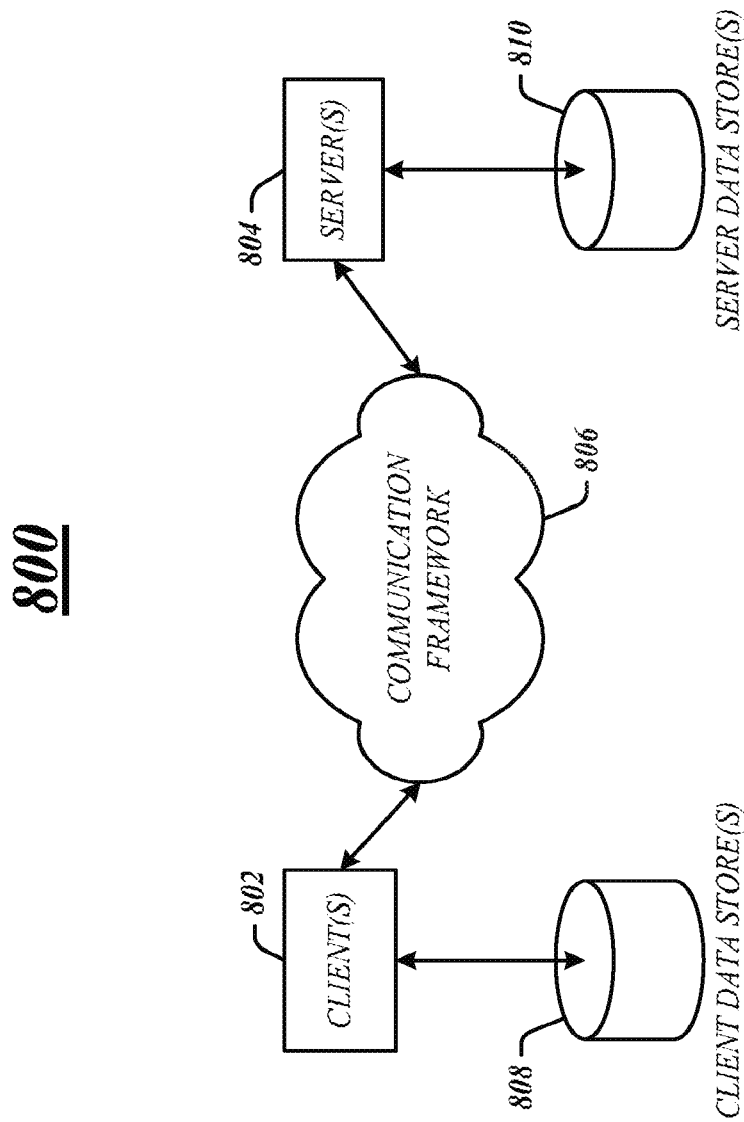
FIG. 8 illustrates one embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols, such as those described with reference to systems 100 and 700. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A digital device hub, comprising:
    processing circuitry;
    a wired network interface;
    wireless circuitry; and
    memory coupled to the processing circuitry, the memory comprising instructions that when executed by the processing circuitry, cause the processing circuitry to:
        receive an indication of an environmental event from a motion sensor via the wireless circuitry, the motion sensor located within a home environment and the environmental event including an indication of detected motion within the home environment,
        identify, responsive to receiving the indication of the environmental event, a first control directive associated with the environmental event,
        transmit the first control directive to a destination device via the wireless circuitry, the destination device located within the home environment,
        receive an indication of a second control directive from a mobile computing device via the wireless circuitry, the second control directive associated with at least one of the destination device or another destination device, the other destination device located within the home environment, and
        relay the second control directive to the at least one of the destination device or the other destination device via the wireless circuitry.

2. The digital device hub of claim 1, the destination device comprising a lighting device or a heating ventilation and air conditioning (HVAC) device located within the home environment, the control directive comprising an indication to change a state of the destination device.

3. The digital device hub of claim 2, the second control directive associated with the destination device and comprising an indication to change the state of the destination device.

4. The digital device hub of claim 1, the destination device comprising a camera and the control directive comprising an indication to record images or videos with the camera.

5. The digital device hub of claim 4, the destination device comprising a camera and the control directive comprising a request for data comprising indications of images or videos recorded at the destination device, the instructions when executed by the processing circuitry, cause the processing circuitry to receive first data comprising indications of the images or videos recorded at the destination device via the wireless circuitry.

6. The digital device hub of claim 5, the instructions when executed by the processing circuitry, cause the processing circuitry to:
    send second data comprising indications of the recorded images or videos to a remote computing device for viewing by a user; or
    send second data comprising indications of the recorded images or videos to the mobile computing device for viewing by the user.

7. The digital device hub of claim 1, the destination device comprising the mobile computing device and the control directive comprising an indication to provide an audio or visual alert via the mobile computing device.

8. The digital device hub of claim 1, the instructions when executed by the processing circuitry, cause the processing circuitry to:
    receive from an input device via the wireless circuitry, command data comprising indications of control words; and
    determine the second control directive based in part on the control words.

9. The digital device of claim 8, wherein the mobile computing device comprises the input device.

10. The digital device hub of claim 1, the memory comprising a unique device identifier (ID) associated with the destination device.

11. The digital device hub of claim 1, the instructions when executed by the processing circuitry, cause the processing circuitry to receive from the destination device a reply via the wireless circuitry, the reply comprising an indication of whether an action associated with the control directive was taken.

12. The digital device hub of claim 1, comprising a universal serial bus (USB) port.

13. A system for a home environment, comprising:
    a motion sensor;
    a thermostat;
    a lighting device; and
    a digital device hub, comprising:
        a wired network interface;
        wireless circuitry;
        processing circuitry; and memory coupled to the processing circuitry, the memory comprising instructions that when executed by the processing circuitry, cause the processing circuitry to:
- receive an indication of an environmental event from the motion sensor via the wireless circuitry, the motion sensor located within a home environment and the environmental event including an indication of detected motion within the home environment,
- identify, responsive to receiving the indication of the environmental event, a first control directive associated with the environmental event, the first control directive comprising an indication to change a state of the lighting device,
- transmit the first control directive to the lighting device via the wireless circuitry, the lighting device located within the home environment,
- identify, responsive to receiving the indication of the environmental event, a second control directive associated with the environmental event, the second control directive comprising an indication to change a state of the thermostat,
- transmit the second control directive to the thermostat via the wireless circuitry, the thermostat located within the home environment,
- receive an indication of a third control directive from a mobile computing device via the wireless circuitry, the third control directive comprising an indication to change a state of at least one of the lighting device or the thermostat, and
- relay the third control directive to at least one of the lighting device or the thermostat via the wireless circuitry.

14. The system of claim 13, the thermostat to be coupled to a heating ventilation and air conditioning (HVAC) system for the home environment.

15. The system of claim 13, comprising a camera, the memory comprising instructions that when executed by the processing circuitry, cause the processing circuitry to:
- identify, responsive to receiving the indication of the environmental event, a fourth control directive associated with the environmental event, the fourth control directive comprising an indication to record images or videos with the camera; and
- transmit the fourth control directive to the camera via the wireless circuitry, the camera located within the home environment.

16. The system of claim 15, the instructions when executed by the processing circuitry, cause the processing circuitry to:
- receive first data from the camera via the wireless circuitry, the first data comprising indications of the images or videos recorded by the camera; and
- send second data comprising indications of the recorded images or videos to a remote computing device via the wired network interface.

17. The system of claim 16, the instructions when executed by the processing circuitry, cause the processing circuitry to send the second data to the mobile computing device via the wireless circuitry.

18. The system of claim 13, comprising an alarm device, the memory comprising instructions that when executed by the processing circuitry, cause the processing circuitry to:
- identify, responsive to receiving the indication of the environmental event, a fourth control directive associated with the environmental event, the fourth control directive comprising an indication to activate the alarm device; and
- transmit the fourth control directive to the alarm device via the wireless circuitry, the alarm device located within the home environment.

19. The system of claim 13, the instructions when executed by the processing circuitry, cause the processing circuitry to:
- receive from an input device via the wireless circuitry, command data comprising indications of control words; and
- determine the third control directive based in part on the control words.

20. The system of claim 19, wherein the mobile computing device comprises the input device.

21. The system of claim 13, the memory comprising a plurality of unique device identifiers (UDIDs), wherein the plurality of UDIDs comprises a first UDID associated with the motion sensor, a second UDID associated with the thermostat, and a third UDID associated with the lighting device.

22. The system of claim 13, the instructions when executed by the processing circuitry, cause the processing circuitry to receive a reply from at least one of the lighting device or the thermostat via the wireless circuitry, the reply comprising an indication of whether an action associated with the first control directive or the second control directive was taken.

23. The system of claim 13, wherein the digital device hub comprises a universal serial bus (USB) port.

* * * * *